Patented Dec. 12, 1939

2,183,053

UNITED STATES PATENT OFFICE 2,183,053

VITAMIN PREPARATION AND METHOD OF MAKING SAME

Harden F. Taylor, New York, N. Y., assignor to The Atlantic Coast Fisheries Company, New York, N. Y., a corporation of Maine No Drawing. Application December 3, 1936, Serial No. 113,988

18 Claims. (Cl. 99—11)

This invention relates to vitamin preparations and the method of making the same.

In my copending application Serial No. 105,086, filed October 10, 1936, there is disclosed a vitamin preparation comprising dry granules of a colloidal substance impervious to oxygen, each granule containing discrete particles of vitamin-bearing liquid dispersed therein and completely imprisoned and surrounded thereby, whereby no free vitamin-bearing liquid is on the exterior surfaces of said colloidal substance. For certain purposes it is highly desirable that the granules of the type aforementioned be of a high state of subdivision or of a small particle size.

An object of this invention is to provide a vitamin preparation comprising dry granules of a colloidal substance impervious to oxygen, each granule being of a very small particle size and containing discrete particles of vitamin-bearing liquid dispersed therein and completely imprisoned and surrounded thereby, whereby no free vitamin-bearing liquid is on the exterior surfaces of said colloidal substance.

Another object of this invention is a method of making the granules described in the previous paragraph.

Other objects of the invention will become apparent from the following description and appended claims.

In accordance with the principles of the instant invention, an appropriate quantity of gelatin is dissolved in warm water to produce a solution of desired concentration. To this solution of gelatin, while at an elevated temperature and still liquid, there is added, if desired, a plasticizer such as glycerin, glucose, etc. in sufficient quantity to prevent the final product from being too hard and too brittle and to impart the desired degree of softness or elasticity in the final product. In this resulting warm solution of gelatin the desired quantity of vitamin-bearing liquid is dispersed, care being taken that, when the vitamin-bearing liquid is dispersed therein, the ultimate droplets thereof will be materially smaller than the smallest size of product to be made, so that the vitamin-bearing liquid will be enveloped by the gelatin. While still hot, this heterogeneous dispersion in its entirety is introduced into an immiscible liquid. By suitable means of mixing, the hot heterogeneous gelatin phase, i. e. vitamin-bearing liquid dispersed in the gelatin, is sub-divided and dispersed in the immiscible liquid. The resulting mass at this stage is in reality an emulsion within an emulsion, so that it is sometimes called a dual or poly-phase emulsion. In other words, the mass at this stage consists of a dispersion in which dispersed gelatin droplets or beadlets containing discrete particles of vitamin-bearing liquid constitute the dispersed phase and the immiscible liquid constitutes the continuous phase.

The degree of dispersion and the fineness of the droplets are governed largely by the vigor and rate of agitation. If extremely fine beadlets are ultimately desired, the agitation will be vigorous and prolonged. If larger beadlets are desired, the agitation is correspondingly shorter and gentler. When the desired degree of dispersion has been secured, this emulsion is poured or spread in any convenient manner on to a chilled support in a manner to produce a film having a thickness of the order of $\frac{3}{32}$ of an inch. The support may be a plate or belt of glass, metal, rubber, etc. previously chilled or provided with equipment, whereby it can be chilled. Alternately, the plate or belt may be previously chilled and then transferred or moved into a refrigerated chamber. The thin film of emulsion is then cooled, whereupon the dispersed gelatin droplets or beadlets containing the still finer droplets of vitamin-bearing oil set to a jelly. Precaution should be taken not to permit the temperature to drop below the freezing point of the water in the gelatin droplet phase; otherwise, the gel would be destroyed for all practical purposes. When the film mass has been cooled sufficiently so that the contained beadlets or droplets of jelly are sufficiently resistant to free handling, the whole sheet or film of dispersed gelatin droplets in the immiscible liquid may be removed from the support and treated so as to separate the gelatin droplets containing the discrete particles of oil therein from each other and from the immiscible liquid and produce distinct beadlets or droplets in a substantially dry state.

In one embodiment of the invention the film mass is broken up by gentle rubbing in such a manner as to separate all of the beadlets from each other. Thereafter, the subsequent operations are so designed as to dry the gel droplets in such a way as to prevent them from sticking together. This I attain by keeping the droplets covered with a film of immiscible liquid and maintaining said droplets in a state of agitation or movement, and preferably continuous, with respect to each other, while being dried, as, for example, by treatment with warm air. When the warm air is blown continuously over the mass, the individual beadlets are successively brought to the surface and exposed to the stream of warm air and slowly dried.

The presence of the immiscible liquid performs a double function. First, it lubricates the beadlets and keeps them involved in a film of the immiscible liquid so as to prevent the beadlets from sticking together and, second, it suppresses the rate of evaporation of moisture from the beadlets to such an extent that the beadlets will not be case hardened. The suppression of the rate of evaporation prevents the removal of moisture from the surface of the beadlets more rapidly than the moisture can diffuse from the interior of each beadlet to its surface. If the immiscible liquid were not present, the beadlets would stick together hopelessly during the process of drying with the undesirable consequences hereinafter set forth and at the same time drying would be so rapid that the exterior of each beadlet would become dried to a rigid frame or shell. Subsequent drying would result in shrinkage of the exterior of each beadlet and setting up strains on the rigid external shells in such a manner as to collapse or deform the latter. However, when the rate of evaporation is suppressed by means of the immiscible liquid, the exterior of each beadlet is not dried more rapidly than the water can diffuse from the inside out, the exterior remains pliable or elastic and the whole bead shrinks to a substantially globular form.

Now referring to the undesirable consequences of the sticking together of the droplets above alluded to, since the droplets contain still finer droplets of vitamin-bearing liquid, it is undesirable to break or get into the substance of any droplet. When two or more droplets stick together and dry while so stuck, they may be separated only by breaking them apart, whereupon a hilum or navel is left on each droplet where the two were cohesed, and at this point the contained droplets of the vitamin-bearing liquid may be exposed. Even though the amount may be small, the exuding vitamin-bearing oil, if, for example, it is a fish liver oil becomes spread on the dried droplets, oxidizes and becomes objectionable in that aldehydes, set up in the oil by degradation under exposure, tend to react with the gelatin to make it insoluble and to impart a disagreeable fishy odor to the product. Also, the presence of even traces of fish liver oil tends to make the beadlets stick en masse and prevents them from freely flowing in the finished product.

In actual practice, if all of the immiscible liquid is left in the broken film mass during the drying as above explained, the presence of so much oil greatly delays the rate of drying. Therefore, one embodiment of the invention contemplates removing the bulk of the circumambient immiscible liquid and leaving a sufficient amount thereof so that it will spread as a thin film over the beadlets. The bulk of the circumambient oil is removed by grinding the mass gently in a suitable solvent and removing the excess of solvent. After the excess of the immiscible liquid has been removed, the drying operation is carried out as above explained.

After the beadlets have been dried to the desired degree, the immiscible liquid is removed as by washing with a suitable solvent. The solvent and particularly the last traces thereof are removed by evaporation. If desired, the beadlets may be further dried to an appropriate degree of dryness.

The final product consists of a mass of dry, free-flowing, tiny gelatin beadlets containing highly dispersed vitamin-bearing oil completely imprisoned therein and surrounded thereby. The tiny beadlets or droplets are of substantially spherical form and have smooth exterior surfaces. Usually, the beadlets are not uniform in size and hence they may be classified into the desired sizes by fractionating sifting.

The beadlet comprising gelatin particles containing discrete particles of vitamin-bearing liquid dispersed therein and completely imprisoned and surrounded thereby may be made of various degrees of fineness as may be required for the ultimate uses thereof. For reasons which will hereafter appear, I prefer that the size thereof be from .01 mm. to 1.0 mm. in diameter.

The degree of fineness of the granules depends on a number of factors which are obvious to one skilled in the art. For example, low viscosity of the gelatin phase (containing an internal oil phase) and high viscosity of the external continuous immiscible liquid phase tend to produce a very fine sub-division of the gelatin matrix, while high viscosity of the gelatin phase and low viscosity of the external phase tend to larger size droplets or beadlets of gelatin. Likewise, high temperatures tend in the direction of delaying the onset of the gel condition of the dispersed gelatin droplets, and, accordingly, increase the length of time during which coalescence of these droplets may occur. Therefore, while high temperature favors high dispersion through lower viscosity of the gelatin phase, it also favors large particle size by the onset of the gel condition. Therefore, rapid means of cooling is desired if smaller particle size is desired. The chemical composition of the oil and gelatin phases are also important factors. The finer the dispersion of the oil phase internally to the gelatin, the more viscous the gelatin phase. If desired, polar compounds, such as fatty acids, soaps of bivalent elements, such as calcium and magnesium or other protective oil-soluble colloids, may be incorporated prior to or simultaneously with the prduction of the dual emulsion. These substances lower the surface tension of the external phase, promote emulsification, and therefore tend to bring about a higher degree of dispersion of the gelatin phase and to stabilize the resulting emulsion. Other substances, such as sterols or partially oxidized unsaturated oils in the oil phase, may be used to control and stabilize the degree of dispersion, all in accordance with the accepted theories and principles of emulsification. By controlling these and other well-known factors, the ultimate particles may be controlled within wide limits, in accordance with desiderata in each particular case.

While the preferred embodiment of the invention contemplates gelatin as the colloidal matrix, it is to be understood that other colloidal materials, such as gum acacia, pectin, boiled starch, tragacanth, casein, glucose, etc. may be used, particularly where properties other than those of gelatin may be desired. If desired, mixtures of colloidal substances may be used. When gelatin is used, it is preferred that the gelatin be prepared so as to be free from oxidizing substances, such as peroxides, oxidases, etc. In practice, this may be accomplished by having the gelatin contain a slight excess of $SO_2$ or other reducing substance.

The water which is used as the solvent for the gelatin should, in the preferred form of the invention, be free of any dissolved oxygen and other oxidizing substances or materials. The dissolved oxygen and other oxidizing materials may be removed from the water by various means. I have found that the dissolved oxygen and oxidizing materials may be expelled from the water by boiling the same.

If it is desired to make certain that no oxidizing substances exist in the gelatin phase, a reducing substance sufficient to reduce all such oxidizing substances may be dissolved in the latter. For this purpose I find vitamin C, otherwise known as ascorbic or cevitamic acid, may be used. If vitamin C is added in excess of the amount required to reduce all oxidizing substances in the gelatin solution, then the unoxidized excess thereof becomes a therapeutic agent itself.

As the vitamin-bearing liquid, high vitamin potent oils, such as fish liver oils, etc. or concentrates thereof, may be used.

As the immiscible liquid which is to constitute the continuous phase of the dual emulsion, any edible oil or fixed oil which is non-toxic and does not become rancid may be used. Mineral oil is the preferred immiscible liquid, though cottonseed oil, cocoanut oil, etc. may be used in place thereof or in admixtures with each other. If desired, a small proportion of linseed oil may be used together with any one of the aforementioned oils to increase its emulsifying characteristics.

As the solvent for removing the bulk of the immiscible liquid and the final film thereof, any low-boiling non-toxic solvent depending on the particular immiscible oil may be used. Though petroleum ether is preferred, methylene chloride, benzol, dichlorethylene, etc. may be mentioned as other illustrative solvents.

Other substances as set forth in my copending application Serial No. 105,086 may be used if desired.

In order to more clearly explain the invention, the following illustrative specific example is given:

*Example*

333 grams of high grade medicinal quality gelatin free from oxidizing substances are dissolved in 667 grams of freshly-boiled distilled water. In making the solution, the dry gelatin is first swelled by immersion in cold water. It is then heated to bring the gelatin into solution, all of which operations being carried out under conditions to exclude, so far as possible, the introduction of oxidizing agents or substances including all bubbles of air, and also to prevent reabsorption of air during the process of making the solution. Where necessary, the pH of the hot solution may be adjusted to a suitable point with reference to the isoelectric point, the exact point chosen depending on the characteristics of the particular gelatin used.

The gelatin solution is maintained at a temperature of about 160° F. in a suitable vessel which is equipped with an agitating member situated well below the surface of the hot gelatin solution and consisting of, for example, a propeller or paddle blade agitator mounted on a vertical shaft driven from a suitable source of power in such a manner as to provide moderately vigorous agitation under the surface of the gelatin, the agitation being insufficient to suck air into the gelatin solution.

As the gelatin solution is agitated 200 grams of fish liver oils containing vitamin A or vitamin D, or both as may be required, are introduced into the gelatin solution at a point near the middle of the agitator member. This can be accomplished, for example, by inserting the tip of a funnel or tube into the gelatin solution and close to the point near the middle of the agitator propeller member and through which the fish liver oil is introduced. In this manner, the oil is introduced and dispersed into the hot gelatin solution without forming a continuous phase outside thereof and without introducing air therein.

At this stage of the operation, the mass consists of a hot gelatin solution maintained at 160° F. and having dispersed therein the vitamin-bearing fish liver oils. The aforementioned gelatin vitamin-bearing fish liver oil emulsion is then introduced into a vessel containing 300 cc. of mineral oil. The mass is immediately agitated with and by a shaking and rolling motion designed to cause the two phases to become intermingled, whereupon the hot gelatin solution phase will become further sub-divided and broken up into droplets or beadlets, and dispersed, forming a dual emulsion. When the desired degree of dispersion in the dual emulsion has been reached, the entire mass is poured on to a chilled aluminum plate of approximately ⅝ inch in thickness, the outer surface of which has been refrigerated to a temperature of 35° F., in such a manner that the mass spreads by flowing to form a flattened mass or film of the order of $\frac{3}{32}$ of an inch in thickness. The plate is then promptly chilled as, for example, by being put into a refrigerating chamber and left until the gelatin mass has been cooled thoroughly and the gelatin droplets contained in the oil are set to a rigid gel. When the mass is thoroughly chilled and the contained gelatin droplets are set to a rigid jelly, the whole sheet of dispersed gelatin containing vitamin-bearing oil droplets and oil is removed from the plate and broken up by gentle rubbing in such a manner as to separate the droplets from each other and keep them in continuous agitation or movement with respect to each other while warm dry air is blown continuously over the mass to dry said droplets.

After the gelatin droplets or beadlets have been dried to the desired degree, the oil is removed therefrom, such as by washing with an oil solvent, for example, petroleum ether. After the oil has been removed, the last traces of the solvent are removed by evaporation and the final product consisting of a mass of tiny dry free-flowing beads of gelatin containing highly dispersed oil imprisoned therein and surrounded thereby results. The beadlets may, if desired, be separated into graded sizes by fractional sifting.

The tiny gelatin beadlets, as previously mentioned, are from 0.01 mm. to 1.0 mm. in diameter and contain discrete particles of vitamin-bearing oils dispersed therein and completely imprisoned and surrounded thereby. These tiny dry vitamin preparations may be used to present oil-soluble vitamins in a substantially dry form and in a high degree of sub-division. For example, these tiny vitamin preparations may be used in poultry feed and will be of a particle size which is not substantially greater than the particle size of the cereal portion of the feed. This is highly desirable, since it is a well-known habit of birds to select certain constituents of their food, if they are distinguishable. The birds might, if the vitamin-bearing beadlets were distinguishable because of size, either select them and consume them in larger proportion than intended or might even discard them and thus not consume the vitamins intended for their diet.

The vitamin-containing beadlets of this invention are also highly useful as the granulation for compressed pharmaceutical tablets with and without medicaments and with or without sugar coatings. As is well known in this case, the beadlets must flow freely in the tablet-making machine and occupy substantially the entire space in the dies. Because of the small particle size, the beadlets satisfactorily perform this function.

Still another use contemplated by the highly subdivided vitamin-bearing dry material of this invention is the incorporation thereof in dry milk, malted milk powder and combinations thereof with other ingredients in dry powder form, such as the familiar chocolate malted milk, sweetened and flavored chocolate and powdered milk combinations with or without added mineral ingredients.

The terms "droplets", "beadlets", "tiny granules", etc. used in this specification are intended to be equivalents.

Since it is obvious that various changes and modifications may be made in the above description without departing from the nature or spirit thereof, this invention is not restricted thereto except as set forth in the appended claims.

I claim:

1. A vitamin preparation comprising substantially dry beadlets of a colloidal substance substantially impervious to oxygen, each beadlet being from 0.01 to 1.0 mm. in diameter and containing discrete particles of vitamin-bearing liquid dispersed therein and completely imprisoned and surrounded thereby, whereby no free vitamin-bearing liquid is on the exterior surfaces of said beadlets.

2. A vitamin preparation comprising substantially dry gelatin beadlets, each beadlet being from 0.01 to 1.0 mm. in diameter and containing discrete particles of vitamin-bearing liquid dispersed therein and completely imprisoned and surrounded thereby, whereby no free vitamin-bearing liquid is on the exterior surfaces of said beadlets.

3. A method of making a vitamin preparation which comprises producing a poly-phase dispersion in which liquid droplets of a colloidal matrix containing vitamin-bearing liquid dispersed therein constitute the dispersed phase and a liquid substantially immiscible with the colloidal matrix constitutes the continuous phase, causing the droplets to solidify sufficiently to permit handling, drying the droplets, and separating the droplets from the immiscible liquid.

4. A method of making a vitamin preparation which comprises producing a warm poly-phase dispersion in which droplets of a colloidal matrix containing vitamin-bearing liquid dispersed therein constitute the dispersed phase and a liquid substantially immiscible with the colloidal matrix constitutes the continuous phase, chilling the poly-phase dispersion until the droplets thereof are set sufficiently to permit handling, drying the droplets, and separating the droplets from the immiscible liquid.

5. A method of making a vitamin preparation which comprises producing a warm poly-phase dispersion in which droplets of a colloidal matrix containing vitamin-bearing liquid dispersed therein constitute the dispersed phase and a liquid substantially immiscible with the colloidal matrix constitutes the continuous phase, spreading the poly-phase dispersion into a sheet or film, chilling said sheet or film until the dispersed droplets are set sufficiently to permit handling, breaking the film or sheet to separate the droplets from each other, agitating the mass, subjecting the mass to a drying medium until the droplets have dried to the desired degree, and separating the dried droplets from the immiscible liquid.

6. A method of making a vitamin preparation which comprises producing a warm poly-phase dispersion in which droplets of a colloidal matrix containing vitamin-bearing liquid dispersed therein constitute the dispersed phase and a liquid substantially immiscible with the colloidal matrix constitutes the continuous phase, spreading the poly-phase dispersion into a sheet or film, chilling said sheet or film until the dispersed droplets are set sufficiently to permit handling, breaking the film or sheet to separate the droplets from each other, agitating the mass, passing warm air over the mass until the droplets have dried to the desired degree, and separating the dried droplets from the immiscible liquid.

7. A method of making a vitamin preparation which comprises producing a warm poly-phase dispersion in which droplets of a colloidal matrix containing vitamin-bearing liquid dispersed therein constitute the dispersed phase and a liquid substantially immiscible with the colloidal matrix constitutes the continuous phase, spreading the poly-phase dispersion into a sheet or film, chilling said sheet or film until the dispersed droplets are set sufficiently to permit handling, breaking the sheet or film to separate the droplets from each other, reducing the quantity of immiscible liquid to an amount sufficient to form a film around the droplets, simultaneously agitating the mass and subjecting the mass to a drying medium until the droplets have been dried to the desired degree, and removing the film of immiscible liquid from the dried droplets.

8. A method of making a vitamin preparation which comprises producing a warm poly-phase dispersion in which droplets of a colloidal matrix containing vitamin-bearing liquid dispersed therein constitute the dispersed phase and a liquid substantially immiscible with the colloidal matrix constitutes the continuous phase, spreading the poly-phase dispersion into a sheet or film, chilling said sheet or film until the dispersed droplets are set sufficiently to permit handling, breaking the sheet or film to separate the droplets from each other, reducing the quantity of immiscible liquid to an amount sufficient to form a film around the droplets, simultaneously agitating the mass and passing warm air over the mass until the droplets have been dried to the desired degree, and removing the film of immiscible liquid from the dried droplets.

9. A method of preparing a vitamin preparation which comprises making a poly-phase emulsion in which gelatin droplets containing discrete particles of a vitamin-bearing liquid dispersed therein constitute the dispersed phase and nonvolatile oil constitutes the continuous phase, spreading the poly-phase emulsion into sheet form, setting the gelatin droplets to permit handling thereof, separating the droplets from each other, simultaneously agitating the mass and subjecting it to a drying medium until the droplets are dried to the desired degree, and removing the oil.

10. A method of preparing a vitamin preparation which comprises making a poly-phase emulsion in which gelatin droplets containing discrete particles of a vitamin-bearing liquid dispersed therein constitute the dispersed phase and mineral oil constitutes the continuous phase, spreading the poly-phase emulsion into sheet form, setting the gelatin droplets to permit handling thereof, removing the bulk of the mineral oil, separating the droplets from each other, simultaneously continuously agitating the mass and passing air over the mass until the droplets are dried to the desired degree, and removing the mineral oil.

11. A process of making a vitamin preparation which comprises producing a poly-phase dispersion in which liquid droplets of a colloidal matrix containing a vitamin-bearing liquid dispersed therein constitute the dispersed phase and a liquid substantially immiscible with the colloidal matrix constitutes the continuous phase, causing said droplets in the presence of said immiscible liquid to set sufficiently to permit handling, subjecting the set droplets in the presence of at least an amount of said immiscible liquid to cover said droplets with a film thereof to a drying medium until the droplets have been dried to the desired degree, and separating the droplets from said immiscible liquid.

12. A process of making a vitamin preparation which comprises producing a poly-phase dispersion in which liquid droplets of a colloidal matrix containing a vitamin-bearing liquid dispersed therein constitute the dispersed phase and a liquid substantially immiscible with the colloidal matrix constitutes the continuous phase, causing said droplets in the presence of said immiscible liquid to set sufficiently to permit handling, simultaneously maintaining said droplets in a state of movement with respect to each other, subjecting the set droplets in the presence of at least an amount of said immiscible liquid to cover said droplets with a film thereof to a drying medium until the droplets have been dried to the desired degree, and separating the droplets from said immiscible liquid.

13. A process of making a vitamin preparation which comprises producing a poly-phase dispersion in which liquid droplets of a colloidal matrix containing a vitamin-bearing liquid dispersed therein constitute the dispersed phase and a liquid substantially immiscible with the colloidal matrix constitutes the continuous phase, spreading said poly-phase dispersion to form a sheet or film thereof, cooling said sheet or film to cause said droplets to set sufficiently to permit handling, breaking said sheet or film to separate the set droplets from each other, drying the set droplets to the desired degree in the presence of at least an amount of said immiscible liquid to cover said droplets with a film thereof, and separating the droplets from said immiscible liquid.

14. A process of making a vitamin preparation which comprises producing a poly-phase dispersion in which liquid droplets of a colloidal matrix containing a vitamin-bearing liquid dispersed therein constitute the dispersed phase and a liquid substantially immiscible with the colloidal matrix constitutes the continuous phase, spreading said poly-phase dispersion to form a sheet or film thereof, cooling said sheet or film to cause said droplets to set sufficiently to permit handling, breaking said sheet or film to separate the set droplets from each other, simultaneously maintaining said droplets in a state of movement with respect to each other and subjecting the set droplets in the presence of at least an amount of said immiscible liquid to cover said droplets with a film thereof to a drying medium until the droplets have been dried to the desired degree, and separating the droplets from said immiscible liquid.

15. In a process of preparing a vitamin preparation, the steps which comprise subjecting set droplets formed of a colloidal matrix containing a vitamin-bearing liquid dispersed therein in the presence of a quantity of a liquid substantially immiscible with the colloidal matrix at least sufficient to cover said droplets with a film to a drying medium until the droplets have been dried to the desired degree, and separating the droplets from the liquid.

16. In a process of preparing a vitamin preparation, the steps which comprise subjecting set droplets formed of a colloidal matrix containing a vitamin-bearing liquid dispersed therein in the presence of a quantity of a liquid substantially immiscible with the colloidal matrix at least sufficient to cover said droplets with a film to a drying medium until the droplets have been dried to the desired degree, maintaining the said droplets in a state of movement with respect to each other during the drying operation, and separating the droplets from the liquid.

17. In a process of preparing a vitamin preparation, the steps which comprise blowing warm air over set droplets formed of a colloidal matrix containing a vitamin-bearing liquid dispersed therein and having at least a film of a liquid substantially immiscible with the colloidal matrix thereover until the droplets have been dried to the desired degree, and separating the droplets from the liquid.

18. In a process of preparing a vitamin preparation, the steps which comprise blowing warm air over set droplets formed of a colloidal matrix containing a vitamin-bearing liquid dispersed therein and having at least a film of a liquid substantially immiscible with the colloidal matrix thereover until the droplets have been dried to the desired degree, maintaining the said droplets in a state of movement with respect to each other during the drying operation, and separating the droplets from the liquid.

HARDEN F. TAYLOR.